UNITED STATES PATENT OFFICE 2,524,224

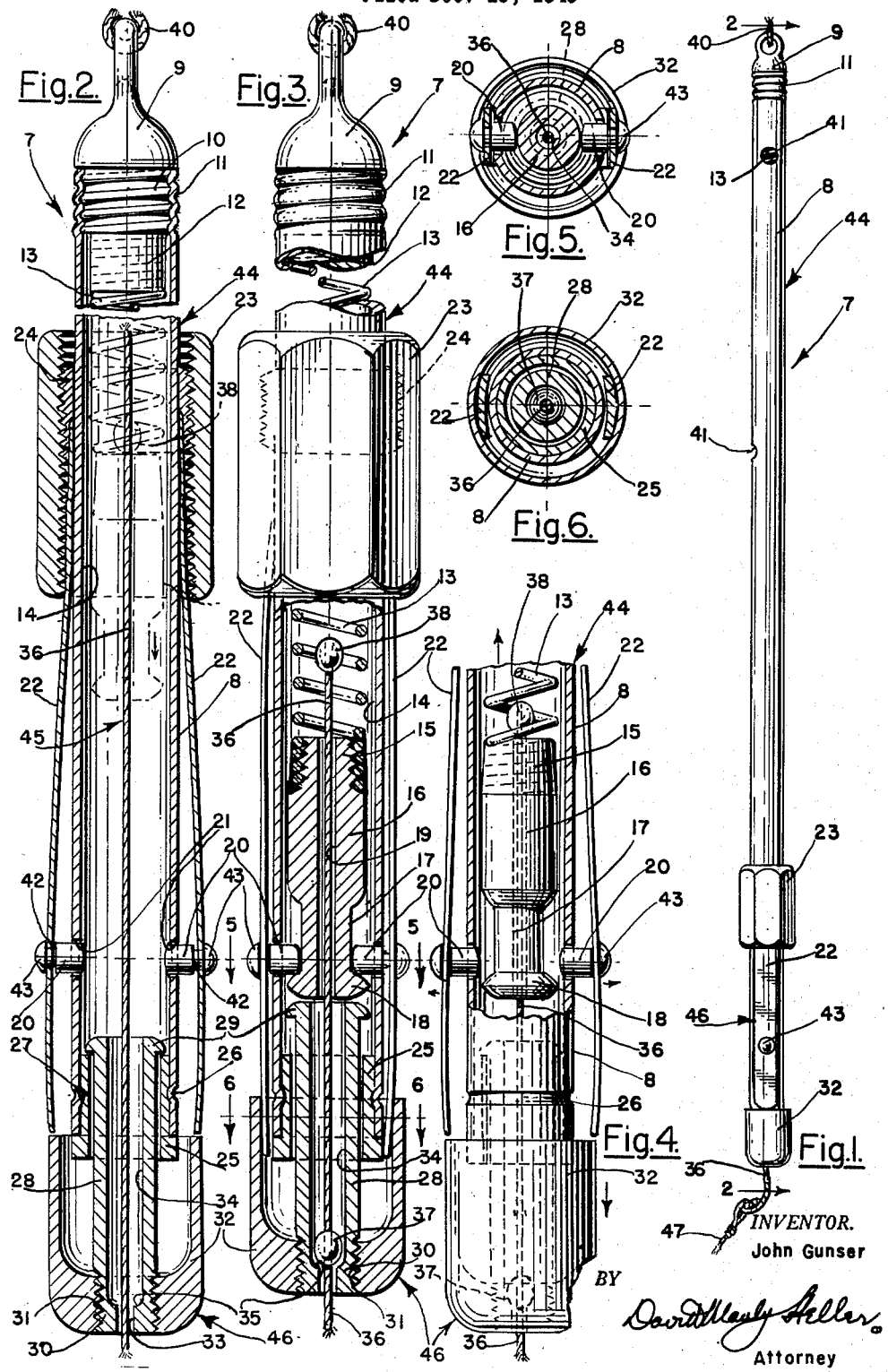

FISH HOOKING MEANS

John Gunser, Chicago, Ill.

Application December 19, 1949, Serial No. 133,861

5 Claims. (Cl. 43—15)

My invention relates to fish hooking devices and is an improvement on my co-pending patent application, Serial Number 98,700, filed June 13, 1949.

A prime object of my invention is to provide a fish hooking device of simple construction that may be attached between the fish line and leader line and serves to hook a fish, or firmly set the hook in the mouth of a fish that has taken the bait by a forceful and instantaneous spring urged retraction of the leader line. The said leader line retracting action being initiated by the slight pull of the fish upon the leader line while taking the bait.

A further important object of my invention is to provide a fish hooking device having a spring urged leader line retracting assembly in connection with a latching and tripping assembly.

A still further object of my invention is to provide a fish hooking device having adjustable tension means for the latching and tripping assembly, making it possible to vary the amount of pull required to trip the latching and tripping assembly.

A further object of my invention is to provide a fish hooking device that may be quickly and easily assembled or taken apart for cleaning or adjusting of the mechanism therein, and which is of small size and may be economically produced in quantity.

Other objects and advantages embraced in my invention will be disclosed in the following description and the accompanying illustrations, wherein like parts are designated by like numerals, and in which:

Fig. 1 is a side view of my invention shown attached between a fish line and a leader line.

Fig. 2 is an enlarged cross sectional view of my invention with parts broken away and taken substantially on line 2—2 on Fig. 1, showing the leader line retracting assembly and the latching and tripping assembly in normal or uncocked position and showing the latching plug and spring in phantom lines.

Fig. 3 is an enlarged side view of my invention with parts broken and cut away showing the leader line retracting assembly and the latching and tripping assembly in a cocked position.

Fig. 4 is an enlarged fragmentary view of the tripping end of my invention with parts cut away showing the act of tripping the latching and tripping assembly.

Fig. 5 is a cross-sectional view of my invention taken substantially on line 5—5 on Fig. 3.

Fig. 6 is a cross-sectional view of my invention taken substantially on line 6—6 on Fig. 3.

Referring to the illustrations, my invention is generally designated 7, and consists of a housing assembly 44, a leader line retracting assembly 45 and a latching and tripping assembly 46. The housing assembly 44 consists of a tubular housing member 8, having a screw eye 9, attached to one of its ends by male and female threaded portions 10 and 11 upon the said screw eye portion 9 and the end of tube 8. The fish line 40 is attached to the eye of screw eye 9 which has a reduced threaded extension 12, upon which is secured, preferably by brazing, the end of a coil spring 13, which is contained within the interior 14 of tube 8.

The coil spring 13 is a tension spring and its other end is attached to the threaded reduced extension 15 of a latching plug 16, preferably by brazing. The said latching plug 16 has an annular groove 17 adjacent its free end, providing a shoulder portion 18 having also a central bore 19 of small diameter. The said latching plug 16 normally floats within interior 14, held by coil spring 13, in a position near the screw eye end of tube 8.

A stop sleeve 25 is secured within the open end of tube 8, held in place by an annular groove 26, formed in the end of tube 8 in alignment with an annular groove 27 in stop sleeve 25. The said stop sleeve 25 would preferably be made of a hardened metal and the housing tube 8 would preferably be formed of a non-corroding metal such as brass.

The latching and tripping assembly 46 consists of a latch locking cap element 32, the open end of which is of a diameter of greater magnitude than that of tube 8, permitting a loose fit thereover. The said latch locking cap element 32 is held in place in a floating engagement with tube 8 by a cap retaining screw 28 which has a shoulder portion 29 engaging or overlapping the inner end of stop sleeve 25. The said cap retaining screw 28 is attached to latch locking cap element 32 by the threaded end portion 30, engaging the tapped opening 31 in the end of the latch locking cap element 32. A small central opening 33 is formed in the threaded end of screw 28 and is counter bored at 34, providing a shoulder portion 35 near the threaded end thereof, serving as a stop to a trip ball 37, which is attached to a flexible wire 36. The said flexible wire element 36 in assembly passes through openings 33 and 34 of screw 28, and also through central bore 19 of latching plug 16 and has a wire stop ball 38 secured to its inner end which stops against the hardened end of latching plug 16 and serves to prevent the flexible wire 36 from being pulled through central bore 19, Resilient latch members 22, preferably of spring steel, are attached in parallel and opposite arrangement upon the outer surface of tube 8 adjacent the open end thereof, with the free ends of the said resilient latch members 22 flush with the end of stop sleeve 25. The other ends of the said resilient latch members 22 would preferably be brazed to the sides of tube 8 and would be further secured by a male threaded sleeve 24 secured over tube 8. Tension adjustability for latch members 22 is provided by a tension adjusting nut 23 which is mounted over the male threaded sleeve 24 of tube 8 so that the tension adjusting nut 23, by being rotated forwardly, would tend to compress the resilient latch members 22. On being retracted, the nut 23 would free the resilient members 22, releasing tension thereon. Locking nubs 20 are oppositely mounted upon latch members 22 by reduced neck portions 42 which are peened over at 43. The said locking nubs 20 are in alignment with aligned openings 21 formed oppositely in tube 8 and near the open end thereof.

To assemble my fish hooking device, the free end of wire 36 is passed through the cap retaining screw 28 and is then introduced into the eye plug end of tube 8 and passed through the tube until it extends from its cap end, together with the end of cap retaining screw 28. Shoulder 29 prevents the said cap retaining screw 28 from passing completely through the tube. Cap 32 is attached upon the threaded end of screw 28 and screw eye 9 is attached by threads 10 and 11 to the other end of tube 8. The fish hooking device is completely assembled.

In normal or unlatched position, my fish hooking device, as illustrated in Fig. 2, is shown with the leader line retracting assembly 45 in retracted position with plug 28 floatingly maintained within interior 14, and with cap 32 loosely held upon the open end of the said tube 8. To cock the latching and tripping assembly 46, the protruding end of flexible wire 36 is pulled forwardly until the grooved portion 17 of plug 16 is opposite the nubs 20, which are normally maintained in extended position flush with the openings 21. Resilient latch members 22 are pressed against the sides of tube 8, causing locking engagement between nubs 20 and annular groove 17. The cap 32 is pressed over the ends of latching members 22, locking the said latching members 22 in a parallel alignment with tube 8, and holding the nubs 20 in locking engagement with groove 17 of latching plug 16. Referring to Fig. 3, it will be observed that in its cocked position, there is approximately a quarter inch of play between wire stop ball 38 and the end of latching plug 16 but that trip ball 37 is in engagement with shoulder portion 35 of screw 28.

In its cocked position, as illustrated in Fig. 3, it will be seen that a slight pull upon flexible wire 36, occasioned by a fish taking the baited hook which would be attached to leader line 47, would cause cap 32 to be pulled forwardly sufficiently to free the ends of resilient latch members 22, causing them to expand or bend away from the surface of tube 8, releasing the latching plug 16 from engagement with nubs 20. The tripping of the latching and tripping assembly 46 would cause spring 13 to instantaneously and forcefully retract wire 36, together with leader line 47, thus firmly setting the hook into the fish's mouth.

One or more drain holes 41 may be formed near the attaching end of tube 8 to permit the water to escape to make the retracting action instantaneous after being tripped.

A prime advantage relating to my invention resides in the simple and ingenuous latching and tripping assembly and in the simplicity of its entire structure which may be quickly and easily taken apart or put together. A further important advantage of my invention is its small size, no larger than a lead pencil, making it easily carried about and easily attached between fish line and leader line.

It will be understood that my intention is to reserve the right to all modifications or improvements related to or suggested by the foregoing description and illustrations of my invention as defined in the following claims.

Having thus disclosed and revealed my invention, what I claim as new and desire to secure by Letters Patent is:

1. Fish hooking means, comprising a tubular housing assembly, a spring-urged leader line retracting assembly mounted within the said tubular housing assembly, a spring-actuated latching and tripping assembly mounted outside of the said tubular housing assembly and provided with locking nub means releasably engaging the said spring-urged leader line retracting assembly, the said spring-urged leader line retracting assembly, including latching plug means floatably mounted within the confines of the said tubular housing assembly and provided with shoulder portions engageable by the said spring-actuated latching and tripping assembly, spring means attached to one end of the said tubular housing assembly and having its other end attached to the upper end of the said latching plug means, flexible wire means passing through a bore in the said latch plug means and having a free end emanating from the said tubular housing assembly, trip ball means secured above the lower end of the said flexible wire means, and stop ball means secured at the upper end of the said flexible wire means.

2. Fish hooking means, comprising a tubular housing assembly, a spring-urged leader line retracting assembly mounted within the said tubular housing assembly, a latching and tripping assembly mounted outside of the said tubular housing assembly and provided with locking nub means releasably engaging the said spring-urged leader line retracting assembly, the said latching and tripping assembly including latch locking cap means, cap retaining screw means provided with shoulder means, stop sleeve means secured to the lower terminus of the said tubular housing assembly to limit the movement of the said latch locking cap means, resilient latch elements mounted exteriorly of said tubular housing assembly, the said locking nub means being secured intermediately the free ends of the said resilient latch elements, the said housing being provided with perforate bore means to permit the said locking nub means to engage the said spring-urged leader line retracting assembly, and the free ends of the said resilient latch elements being confined between the said latch locking cap means and the outer surface of the said tubular housing assembly when the said fish hooking means is cocked.

3. Fish hooking means, comprising a tubular housing assembly, a spring-urged leader line retracting assembly mounted within the said tubular housing assembly, a spring-actuated latching and tripping assembly mounted outside of the said tubular housing assembly and provided with locking nub means releasably engaging the said spring-urged leader line retracting assembly, the said spring-urged leader line retracting assembly, including latching plug means floatably mounted within the confines of the said tubular housing assembly and provided with shoulder portions engageable by the said spring-actuated latching and tripping assembly, spring means attached to one end of the said tubular housing assembly and having its other end attached to the upper end of the said latching plug means, flexible wire means passing through a bore in the said latch plug means and having a free end emanating from the said tubular housing assembly, trip ball means secured above the lower end of the said flexible wire means, stop ball means secured at the upper end of the said flexible wire means, the said latching and tripping assembly including latch locking cap means, cap retaining screw means provided with shoulder means, stop sleeve means secured to the lower terminus of the said tubular housing assembly to limit the movement of the said latch locking cap means, resilient latch elements mounted exteriorly of said tubular housing assembly, the said locking nub means being secured intermediately the free ends of the said resilient latch elements, the said housing being provided with perforate bore means to permit the said locking nub means to engage the said spring-urged leader line retracting assembly, and the free ends of the said resilient latch elements being confined between the said latch locking cap means and the outer surface of the said tubular housing assembly when the said fish hooking means is cocked.

4. Fish hooking means, comprising a tubular housing assembly, a spring-urged leader line retracting assembly provided with a plurality of drain openings mounted within the said tubular housing assembly, a spring-actuated latching and tripping assembly mounted outside of the said tubular housing assembly and provided with locking nub means releasably engaging the said spring-urged leader line retracting assembly, the said latching and tripping assembly including latch locking cap means, cap retaining screw means provided with shoulder means, stop sleeve means secured to the lower terminus of the said tubular housing assembly to limit the movement of the said latch locking cap means, resilient latch elements mounted exteriorly of said tubular housing assembly, the said locking nub means being secured intermediately the free ends of the said resilient latch elements, the said housing being provided with perforate bore means to permit the said locking nub means to engage the said spring-urged leader line retracting assembly, the free ends of the said resilient latch elements being confined between the said latch locking cap means and the outer surface of the said tubular housing assembly when the said fish hooking means is cocked, the said drain openings in the said tubular housing assembly permitting egress of water within the said tubular housing assembly so as to afford instantaneous tripping action to the said fish hooking means.

5. Fish hooking means, comprising a tubular housing assembly, a spring-urged leader line retracting assembly provided with a plurality of drain openings mounted within the said tubular housing assembly, a spring-actuated latching and tripping assembly mounted outside of the said tubular housing assembly and provided with locking nub means releasably engaging the said spring-urged leader line retracting assembly, the said spring-urged leader line retracting assembly, including latching plug means floatably mounted within the confines of the said tubular housing assembly and provided with shoulder portions engageable by the said spring actuated latching and tripping assembly, spring means attached to one end of the said tubular housing assembly and having its other end attached to the upper end of the said latching plug means, flexible wire means passing through a bore in the said latch plug means and having a free end emanating from the said tubular housing assembly, trip ball means secured above the lower end of the said flexible wire means, stop ball means secured at the upper end of the said flexible wire means, the said latching and tripping assembly including latch locking cap means, cap retaining screw means provided with shoulder means, stop sleeve means secured to the lower terminus of the said tubular housing assembly to limit the movement of the said latch locking cap means, resilient latch elements mounted exteriorly of said tubular housing assembly, the said locking nub means being secured intermediately the free ends of the said resilient latch elements, the said housing being provided with perforate bore means to permit the said locking nub means to engage the said spring-urged leader line retracting assembly, the free ends of the said resilient latch elements being confined between the said latch locking cap means and the outer surface of the said tubular housing assembly when the said fish hooking means is cocked, the said drain openings in the said tubular housing assembly permitting egress of water within the said tubular housing assembly so as to afford instantaneous tripping action to the said fish hooking means.

JOHN GUNSER.

REFERENCES CITED

The following references are of record in the file of this patent:

UNITED STATES PATENTS

| Number | Name | Date |
|---|---|---|
| 1,086,256 | Wilber et al. | Feb. 3, 1914 |
| 1,442,981 | Sherry | Jan. 23, 1923 |
| 2,144,175 | Zonn | Jan. 17, 1939 |
| 2,147,917 | Noren | Feb. 21, 1939 |
| 2,479,399 | Patten | Aug. 16, 1949 |